(12) United States Patent
Zhang et al.

(10) Patent No.: US 11,238,736 B2
(45) Date of Patent: Feb. 1, 2022

(54) SYSTEMS AND METHODS FOR VEHICLE PARKING MANAGEMENT

(71) Applicant: Neutron Holdings, Inc., San Francisco, CA (US)

(72) Inventors: Xi Zhang, Shengzhen (CN); Yuxin Zhai, Shengzhen (CN); Xiaotao Xiao, Shengzhen (CN)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

(21) Appl. No.: 16/868,395

(22) Filed: May 6, 2020

(65) Prior Publication Data

US 2020/0279485 A1 Sep. 3, 2020

Related U.S. Application Data

(63) Continuation of application No. PCT/CN2018/114312, filed on Nov. 7, 2018.

(30) Foreign Application Priority Data

Nov. 7, 2017 (CN) .......................... 201721469802.2

(51) Int. Cl.
*G08G 1/14* (2006.01)
*G07F 17/00* (2006.01)
*H04W 4/029* (2018.01)
*H04W 4/44* (2018.01)
*G08G 1/00* (2006.01)

(52) U.S. Cl.
CPC .......... *G08G 1/148* (2013.01); *G07F 17/0057* (2013.01); *G08G 1/146* (2013.01); *G08G 1/20* (2013.01); *H04W 4/029* (2018.02); *H04W 4/44* (2018.02)

(58) Field of Classification Search
CPC .......... G08G 1/148; G08G 1/146; G08G 1/20; H04W 4/44; H04W 4/029; G07F 17/0057
See application file for complete search history.

(56) References Cited

U.S. PATENT DOCUMENTS 9,684,911 B2 * 6/2017 Audet .................... G06Q 10/06
2002/0174077 A1 * 11/2002 Yui .......................... G07C 9/27
705/400

(Continued)

FOREIGN PATENT DOCUMENTS

CN 106803355 A 6/2017
CN 106846642 A 6/2017

(Continued)

*Primary Examiner* — Thomas D Alunkal
(74) *Attorney, Agent, or Firm* — Dentons US LLP (57) ABSTRACT

The disclosure provides a parking management system and a parking management method. The parking management system can comprise one or more servers in communication with one or more vehicles. The one or more vehicles can be configured to be shared and utilized by one or more users for transportation. The one or more servers can be configured to receive location data from the one or more vehicles, and determine, based on the received location data and for each vehicle, whether the vehicle is located within one or more predefined parking areas when (1) the vehicle is not in use or (2) upon completion of a transportation trip by the vehicle.

17 Claims, 5 Drawing Sheets

(56) References Cited

U.S. PATENT DOCUMENTS

| | | | |
|---|---|---|---|
| 2010/0245128 A1* | 9/2010 | Kanof | B62H 3/00 340/932.2 |
| 2012/0239248 A1* | 9/2012 | Bobbitt | G08G 1/127 701/36 |
| 2015/0074004 A1* | 3/2015 | Song | G07C 9/00896 705/307 |
| 2016/0090754 A1* | 3/2016 | Mohamed | E05B 45/06 70/15 |
| 2016/0189435 A1* | 6/2016 | Beaurepaire | G06Q 30/0208 705/13 |
| 2017/0039668 A1* | 2/2017 | Luke | G06Q 10/06 |
| 2017/0206786 A1* | 7/2017 | Dhondse | G08G 1/143 |
| 2017/0316534 A1* | 11/2017 | Hirose | G06Q 10/087 |
| 2018/0286237 A1* | 10/2018 | Hu | H04W 4/40 |
| 2019/0141479 A1* | 5/2019 | Jiang | G01S 19/51 |

FOREIGN PATENT DOCUMENTS

| | | |
|---|---|---|
| CN | 106971465 A | 7/2017 |
| CN | 107025800 A | 8/2017 |
| CN | 107230346 A | 10/2017 |
| CN | 107231405 A | 10/2017 |
| CN | 107231609 A | 10/2017 |
| CN | 110431608 A | 11/2019 |
| JP | 2010-146229 A | 7/2010 |
| JP | 2016012291 A | 1/2016 |

* cited by examiner

SYSTEMS AND METHODS FOR VEHICLE PARKING MANAGEMENT

CROSS-REFERENCE TO RELATED APPLICATION(S)

This application claims priority to Chinese application no. Application NO. 201721469802.2, filed Nov. 7, 2017 and is a continuation of PCT application no. WO 2019/091395, filed Nov. 7, 2018, the content of each of which is herein incorporated by reference in its entirety.

BACKGROUND

A vehicle sharing system is a service that allows people to access vehicles for shared use for a specified amount of time and/or for a specified fee. Vehicle sharing has emerged as an innovative form of public transport to provide urban short-distance transportation services that are often underserved by other forms of public transportation.

A dockless vehicle sharing system does not require a docking station. A dockless vehicle sharing system provides increased convenience for users because the vehicles can be parked either at a bike rack or along the sidewalk after the vehicles have been used. However, in some cases, dockless vehicles may sometimes obstruct sidewalks and interfere with pedestrians' right-of-way if the vehicles are improperly parked.

SUMMARY

There is a need to provide improved methods and systems for parking management of mobile transportation vehicles. A mobile transportation vehicle as described herein may include shared vehicles such as e-bikes, scooters, mobility transportation pods, and the like.

An aspect of the invention is directed to a parking management system, comprising one or more servers in communication with one or more vehicles, wherein the one or more vehicles are configured to be shared and utilized by one or more users for transportation, and wherein the one or more servers are configured to receive location data from the one or more vehicles; and determine, based on the received location data and for each vehicle, whether the vehicle is located within one or more predefined parking areas in a public space when (1) the vehicle is not in use or (2) upon completion of a transportation trip by the vehicle.

Aspects of the invention also provide a parking management method, comprising receiving location data from one or more vehicles, wherein the one or more vehicles are in communication with one or more servers, and wherein the one or more vehicles are configured to be shared and utilized by one or more users for transportation; and determining, based at least in part on the received location data and for each vehicle, whether the vehicle is located within one or more predefined parking areas when (1) the vehicle is not in use or (2) upon completion of a transportation trip by the vehicle.

Aspects of the invention also provides a non-transitory computer-readable medium storing instructions that, when executed, causes a computer to perform a parking management method, the method comprising receiving location data from one or more vehicles, wherein the one or more vehicles are in communication with one or more servers, and wherein the one or more vehicles are configured to be shared and utilized by one or more users for transportation; and determining, based at least in part on the received location data and for each vehicle, whether the vehicle is located within one or more predefined parking areas when (1) the vehicle is not in use or (2) upon completion of a transportation trip by the vehicle.

Aspects of the invention also provide a parking management system, comprising a server and at least one parking management device, wherein the at least one parking management device is configured to receive a first signal sent from a target bike and send the first signal to the server, and wherein the server is configured to (1) receive the first signal sent from the at least one parking management device, and (2) determine, based on the at least one first signal, whether a location of the target bike is within a preset parking area, wherein a location of the preset parking area is associated with a location of the at least one parking management device.

Aspects of the invention also provide a parking management system, comprising a primary device, wherein the primary device comprises a second short-range communication unit configured to (1) receive a second signal sent from a target bike, and (2) receive a third signal sent from at least one parking management slave device, wherein the third signal is a fourth signed received by the parking management slave device from the target bike, wherein the signal is transmitted based on a short-range wireless communication protocol; and a controller coupled to the second short-distance communication unit, the controller being configured to determine, according to the second signal and the third signal, whether a location of the target bike is within a preset parking area, wherein a location of the preset parking area is associated with a location of the primary and slave devices.

Aspects of the invention also provide a parking management system, comprising a primary device located at an edge of a preset parking area, the primary device comprising a fourth short-distance communication unit configured to receive a second signal sent from the target bike, wherein the second signal is transmitted based on a short-range wireless communication protocol, wherein the signal receiving direction of the short-range communication unit is a preset direction, and wherein the preset direction covers the preset parking area; and a controller coupled to the fourth short-distance communication unit, the controller being configured to determine, according to the second signal, whether a location of the target bike is within the preset parking area.

Aspects of the invention also provide a parking management system, comprising an imaging unit configured to obtain a first image of a target vehicle when the target vehicle is parked in a predefined parking area; a storage unit configured to store therein a second image of the predefined parking area; and a determination unit configured to compare the second image with the first image and determine whether the target vehicle is parked within the predefined parking area.

The systems and methods disclosed herein can be implemented in particular embodiments so as to realize one or more of the following advantages: by identifying and alerting users of shared vehicles to predefined parking areas that comply with local regulations, the systems and methods described herein can help reduce sidewalk congestion, increase pedestrian, bicyclist, and motorist safety, and reduce unsightly clutter. At the same time, the parking management system and methods described herein can allow users to park shared vehicles outside of docking stations. e.g., when nearby docking stations are full or when no docking stations are nearby, which provides additional flexibility and convenience to users.

It shall be understood that different aspects of the present disclosure can be appreciated individually, collectively, or in combination with each other. Other objects and features of the present disclosure will become apparent by a review of the specification, claims, and appended figures. Various aspects of the disclosure described herein may be applied to any of the particular applications set forth below or for any other types of vehicles and movable objects. Any description herein of a bike, may apply to and be used for any movable object, such as any vehicle.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

This disclosure describes parking management systems and methods for a vehicle sharing system. A vehicle sharing system is a system that allows a plurality of users to share vehicles, e.g., bicycles, electric bicycles, sitting and standing scooters, transportation pods, and the like, for personal transportation trips. Generally, the vehicles in a fleet of vehicles in a vehicle sharing system are widely distributed in a particular geographic region, e.g., city, so that users in the geographic region can quickly locate and access a vehicle. Generally, a user rents a nearby available vehicle for a predefined or indefinite amount of time and for a specified fee, e.g., $0.15 per minute. The user can use the vehicle for a transportation trip during the rental period. Upon completion of the transportation trip, the user can park the vehicle at a docking station or in another predefined parking area, at which time the vehicle is available for use by one or more other users.

The vehicle sharing system can include a software application that users install on their mobile devices that allows the users to locate, rent, unlock, and activate available vehicles; plan travel routes; track transportation trips; and find docking stations and other predefined parking areas in which to place vehicles after completing transportation trips. To provide the above-mentioned functionality, the software application is configured to communicate, either directly or indirectly through a remote server, with the vehicles. For example, the software application can communicate directly with the vehicles over a short-range communication network, e.g., Bluetooth network, or indirectly with the vehicles over a long-range mobile network.

There is a need to provide improved systems and methods for parking vehicles in a vehicle sharing system. Generally, there are not enough docking stations to accommodate all vehicles in a fleet of vehicles in a vehicle sharing system. Moreover, docking stations that do have available spots may be geographically inaccessible or inconvenient for certain users to use. To that end, this disclosure describes a dockless parking management system for a vehicle sharing system. The parking management system includes a server that can receive location data from one or more vehicles in a fleet of vehicles in a vehicle sharing system. The server can determine whether the vehicles are located within predefined parking areas and instruct users to park the vehicles in the predefined parking areas if they are not. The server can generate the predefined parking areas using parking regulations for the geographic region in which the vehicle sharing system operates. For example, the server can generate predefined parking areas that comply with all city parking regulations, e.g., parking areas that do not block rights-of-way and that are not on public property. By instructing users to park vehicles in predefined parking areas that comply with parking regulations, the parking management system described herein can reduce sidewalk congestion, increase pedestrian, bicyclist, and motorist safety, and reduce unsightly clutter. At the same time, the parking management system and methods described herein can allow users to park shared vehicles outside of docking stations, e.g., when nearby docking stations are fill or when no docking stations are nearby, which provides additional flexibility and convenience to users.

Figure 1:
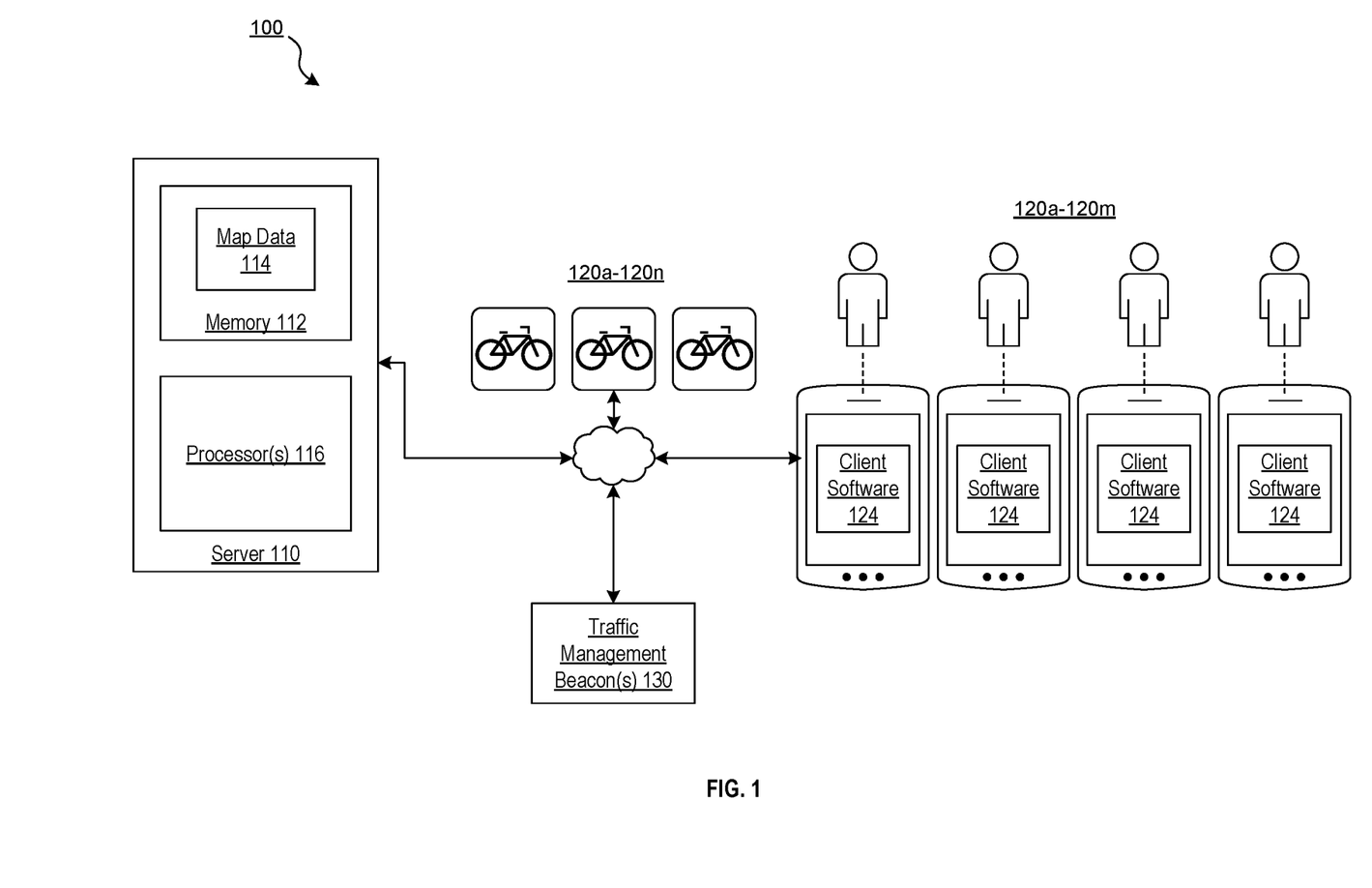
FIG. 1 shows a parking management system, in accordance with an embodiment of the disclosure.

FIG. 1 illustrates a parking management system 100 of a vehicle sharing system, in accordance with an embodiment of the disclosure.

The parking management system 100 may include a server 110 that is configured to communicate with one or more vehicles (e.g. 120*a* through 120*n*). The vehicles can be configured to be operated by one or more users (e.g. 122*a* through 122*m*). A user is a person who has access to the vehicle sharing system and who operates a vehicle in the vehicle sharing system. Because there may be more users than vehicles, the vehicles can be configured to be shared among the users. As an example, a first user 122*a* can temporarily operate a first vehicle 120*a* to travel from one location to another. After the first user 122*a* has completed the trip, the vehicle 120*a* may be made available for use by another user (e.g. user 122*b* and so forth).

The users 122*a*-122*m* may use instances of client software 124 installed on their respective mobile devices 126*a*-126*m*, laptop or desktop computers, electronic tablets, smart watches, or the like, to share the use of the vehicles, and to communicate with the parking management system 100. Users 122a-122m can download the client software 124 from an app store, e.g., the Google Play Store or the Apple App Store. The client software 124 allows users to locate, rent, unlock, and activate available vehicles in the vehicle sharing system; plan travel routes; track transportation trips; and find docking stations and other predefined parking areas in which to place vehicles after completing transportation trips. To provide the above-mentioned functionality, the client software 124 is configured to communicate, either directly or indirectly through the server 110, with the vehicles 120a through 120n. For example, the client software 124 can communicate directly with the vehicles 120a-120n over a short-range communication network, e.g., Bluetooth network, or indirectly with the vehicles over a long-range mobile network.

The client software 124 can include payment functionality whereby users enter credit or debit card information for use in renting vehicle time. The client software 124 can also include map functionality that causes the mobile devices 126a-126m to display maps on visual displays of the mobile devices. The maps can include roads, buildings, natural geographic features, travel routes, the location of available vehicles, and the predefined parking areas, to name a few examples.

The vehicles 120a-120n can include non-electric bicycles, electric bicycles, standing scooters, sitting scooters, transportation pods, or the like. Generally, the vehicles 120a-120n are configured to accommodate a single user and to travel ten or less miles per transportation trip. The vehicles 120a-120n are most often a "last-mile" transportation solution, i.e., a means by which commuters travel from a public transportation hub to a final destination, e.g., a place of employment.

Each vehicle can include one or more sensors, including speedometers and accelerometers, global positioning system (GPS) sensors, radar or LIDAR sensors, cameras, and the like. Speedometers and accelerometers can track speed and acceleration data and provide that data to users' mobile devices via the client software 124. GPS sensors can determine the locations of vehicles. And radar sensors, LIDAR sensors, and cameras can collect data that can be used to localize and navigate vehicles with respect to their environment. To that end, each vehicle can also include an on-board computer to process data collected by the above-mentioned sensors.

Each vehicle may also include one or more communication devices that can communicate with the server 110 and the mobile device of the respective user who is operating the vehicle. For example, each vehicle can include a short-range communication device, e.g., Bluetooth, Wi-Fi. or ZigBee communication device, configured to communicate with the user's mobile device, and a long-range communication device, e.g., a mobile network communication device configured to communicate with the server 110 over a mobile network.

The server 110 may include memory 112 that stores a database of information of the parking management system. Generally, the memory 112 is static random access memory (SRAM). The memory 112 can be configured to store map data 114 that defines a geographic region, e.g., a city. Generally, the map data 114 includes a plurality of features, e.g., highways, roads, bridges, buildings, and natural geographic features, that are each associated with a particular location or range of locations represented by GPS coordinates. The map data 114 can include a plurality of levels of abstraction of a geographic region. One level of abstraction may show only major roads and highways and large geographic features. A second level of abstraction may show city blocks, including minor roads and buildings. And a third level of abstraction may show a street-level view of a location.

The map data 114 can also define one or more predefined parking areas that are configured to accommodate one or more types of vehicles. For example, the map data 114 can define a range or bounding box of GPS coordinates that demarcate a parking area in the geographic region. The predefined parking areas can be two-dimensional areas parallel with the ground plane and/or in line with the ground plane. Additionally or alternatively, the predefined parking areas can be three-dimensional spaces or volumes if, for example, the map data 114 is represented in three dimensions (e.g. a 3-dimensional map). The predefined parking areas can have, for example, a rectangular, circular, elliptical, or irregular cross-section, depending on parking regulations and available space in the vicinity of each parking area. Generally, each predefined parking area can accommodate several to several dozen vehicles and has a cross-section on the order of tens to hundreds of square feet.

The server 110 can generate the predefined parking areas for vehicles using rule-based algorithms derived from parking regulations in the geographic region. Rule-based algorithms include a rule base, i.e., programmatically defined rules that correspond to the parking regulations, and an inference engine or semantic reasoner that selects solutions to the rules from among a set of possible solutions, i.e., predefined parking areas that satisfy the rules in the rule base from among all areas in the geographic region in which the vehicle sharing system operates.

For convenience and by way of example, geographic regions will be referred to below as cities. A given city's parking regulations may specify that vehicles, e.g., bicycles, scooters, and transportation pods, may not: (i) block sidewalks, bicycle lanes, or other rights-of-way; (ii) be within a particular distance, e.g., three feet, five feet, or ten feel, of curbs, private property, cross-walks, or wheel chair ramps; (iii) be parked on certain streets, blocks, or neighborhoods in the city, or (iv) be parked outside of designated areas.

In some instances, city parking regulations may specify areas in which parking is forbidden. In some other instances, city parking regulations may specify areas in which parking is restricted, e.g., restricted to a particular class of vehicle. As another example, a parking-restricted region may be a region in which only the vehicle from one or more specific vehicle sharing service providers are allowed to park. As yet another example, a parking-restricted region may be a region in which parking vehicles is allowed only during a certain time period.

The memory 112 can maintain areas in which parking is forbidden and areas in which parking is restricted in the map data 114. The memory 112 maintains such areas as ranges of coordinates. In some embodiments, the server 110 can transmit a signal to any vehicle within a predefined distance, e.g., 500 feet, of such forbidden or restricted coordinate ranges, where the signal causes the vehicle to indicate or display a warning to the user of the vehicle. Additionally or alternatively, the server 110 can transmit the coordinate range of a forbidden or restricted area to each vehicle within a specified distance of that forbidden or restricted area. The server 110 can compute the distance between each vehicle and the forbidden or restricted areas using GPS coordinates received from the vehicles.

The server 110 can gather such regulations, e.g., from an online database made available by the city, and translate the regulations into the rule-based algorithms that generate predefined parking areas based on the city regulations, where the predefined parking areas include permitted parking areas for one or more types of vehicles. The server 110 can translate the parking regulations into rule-based algorithms using natural language processing methods known in the art. For example, the server 110 can implement a neural network that was trained to translate natural language parking regulations into programmatic rules in a supervised learning environment. Training data for such a neural network could include sets of example parking regulations and corresponding programmatic rules that were manually derived from the parking regulations. The above example is not limiting, and the server 110 can utilize other natural language processing methods known in the an.

In some implementations, in generating the predefined parking areas, the server 110 may prioritize certain parking regulations over others. The server 110 can prioritize city parking regulations that are particularly important to user or pedestrian safety. For example, the server 110 can prioritize satisfying parking regulations that prohibit vehicles from being parked in the street, and can even set more stringent requirements than those specified by city regulations, e.g., by generating predefined parking areas that are farther from the street than required by city regulations. Additionally or alternatively, the server 110 can prioritize city parking regulations that impose large fines. For example, the server 110 can place high priority on not blocking sidewalks, which may constitute an ADA violation.

The server 110 can routinely check the online database of parking regulations for updated parking regulations, or receive updates whenever the online database is updated with new parking regulations or revisions to existing regulations. If any regulations have changed, the server can update the rules-based algorithms and predefined parking areas accordingly.

In some embodiments, the updated parking regulations include temporary parking regulations which are valid for a specific period of time in a specific geographic region. For example, the server 110a can generate a temporary parking area for a particular event held at a particular place. The organizer of the event can apply for the temporary parking aica with a traffic management authority. The application can comprise at least a time period, a date and a geographic region of the temporary parking area. As another example, a temporary parking-forbidden parking area can be set for a particular event held at a particular place. The organizer of the event can apply for a setting of the temporary parking-forbidden area with a traffic management authority. The application can comprise at least a time period, a date and a geographic region of the temporary parking-forbidden area.

In some embodiments, the updated parking regulations can comprise a change in parameters of an existing parking area. The parameters of an existing parking area can comprise a geographic region, a shape, a priority, a valid time period, a priority, and/or an allowable type of vehicle. For example, an existing parking area may only accept a parking of electric scooters. The updated parking regulations may allow the existing parking area to accept a parking of transportation pods. For another example, an area of an existing parking area may be reduced from 1,000 square feet to 800 square feet. For yet another example, a shape of an existing parking area may be changed from a rectangle to a square.

In some embodiments, the updated parking regulations can comprise removal of an existing parking area. For example, a request of removing an existing parking area can be applied by an entity or an individual of interest with a traffic management authority.

In some embodiments, the updated parking regulations can comprise adding of a new parking area. For example, a new parking area can be added when a new office building is constructed. In some embodiments, the updated parking regulations can comprise adding of a new parking-forbidden area. For example, a request of adding a parking-forbidden area can be applied for by an entity or an individual of interest with a traffic management authority.

Some city parking regulations may be time-dependent. For example, some areas may be designated as permitted parking areas at night when pedestrian traffic is light, but may be designated as prohibited parking areas during the day when pedestrian traffic is heavy. The algorithms that generate the predefined parking areas can be configured to incorporate such temporal restrictions.

The server 110 may include one or more processors 116. The processor(s) 116 can be configured to perform computations related to determining whether the vehicles 120a-120n are located in the predefined parking areas. For example, the processor(s) 116 can compare the current GPS coordinates of a respective vehicle to the coordinate ranges that define the predefined parking areas to determine if the vehicle is in one of the predefined parking areas.

Generally, the server 110 may be a remote server that can communicate with the vehicles 120a-120n and the mobile devices 126a-126m over a long-range network, e.g., a mobile network. Alternatively, the server 110 can include two or more servers that are each in close proximity to a respective predefined parking area, and configured to communicate with vehicles and mobile devices that are near the predefined parking area over a short-range network, e.g., a Wi-Fi network, a ZigBee network, or a Bluetooth network.

The parking management system can optionally include one or more parking management beacons 130 associated with and located in close proximity to one or more of the predefined parking areas. The parking management beacons 130 can be mounted to the ground at the boundary, the center, or at another location within the respective predefined parking areas they are associated with. The parking management beacons 130 can double as vehicle docks, or be connected to vehicle docks. The height of the parking management beacons 130 can be higher than the heights of the vehicles, such that wireless communication between the parking management beacons 130 and the vehicles is not adversely affected.

The parking management beacons 130 can be in communication with a subset of vehicles within a predetermined distance. In some instances, short-range communication units of the parking management beacons 130 can be configured to monitor broadcast signals from a plurality of vehicles, and receive or discard the broadcast signals based on an identification of the vehicles contained in the broadcast signals. For instance, the broadcast signals transmitted from the vehicles can carry an identification of the vehicles which varies with respect to various vehicle-rental service providers. The short-range communication unit can determine if a vehicle is a target vehicle to be communicated or regulated based on the identification of the vehicle. For example, the parking management beacons 130 can only communicate with those vehicles from one or more predetermined vehicle-rental service providers. Based on one or more properties of the signals, the server 110 can determine whether the vehicles are located within one of the predefined parking areas. For example, based on the strength of the signal and the direction of its source, the server 110 can use trigonometric principles to determine whether a vehicle is within a predefined parking area.

The parking management beacons 130 can be capable of communicating with the server 110. The communication between the parking management beacons 130 and the server 110 can be effected with a long-distance communication network such as a telecommunication network. For instance, the parking management beacons 130 can include a long-range communication unit configured to communicate with the server. The parking management beacons 130 can transmit the vehicle information to the server.

The number of the parking management beacons 130 can be determined based at least in part on a shape the parking area. One parking management beacon 130 can be provided to a parking area if the shape of the parking area is circular, half-circular or fan-shaped. For example, one parking management beacon 130 can be provided at a center point of a circular parking area. Two parking management beacons 130 can be provided to a parking area having a rectangular or elliptical shape. For example, two parking management beacons 130s can be respectively provided at midpoints of opposite sides of a rectangular parking area. For another example, two parking management beacons 130 can be respectively provided at adjacent corner points of a rectangular parking area. For another example, two parking management beacons 130 can be respectively provided at focuses of an elliptical parking area. Two or more parking management beacons 130s can be provided to a parking area having an irregular shape.

A position of parking management beacon 130 with respect to the parking area can vary according to a shape of the parking area. The parking management beacons 130 can be positioned within the parking area. For example, the parking management beacons 130 can be positioned within a circular parking area at the center point thereof. The parking management beacons 130 can be positioned at an edge/boundary of the parking area. For example, the parking management beacons 130 can be respectively provided at a corner point of a rectangular parking area. The parking management beacons 130 can be positioned external to the parking area. For example, the parking management beacons 130 equipped with a directional antenna can be positioned external to a fan-shaped parking area and communicate with vehicles which are within the fan-shaped parking area.

The server 110 can be configured to have a storage capability to store therein at least one of a geographical position of the parking management beacons 130, a number of the parking management beacons 130, a geographical shape of a parking area associated with the parking management beacons 130, and a parking regulation of the parking area associated with the parking management beacons 130. Optionally, the server can be in communication with a database where at least one of a geographical position of the parking management beacons 130, a number of the parking management beacons 130, a geographical shape of a parking area associated with the parking management beacons 130, and a parking regulation of the parking area associated with the parking management beacons 130 is stored and/or indexed. The server can be provided with one or more processors configured to process the vehicle information received from the parking management beacons 130. For example, the server can calculate a geographical position of a vehicle based in part on the vehicle information and determine whether the vehicle is positioned within the parking area.

In some instances, the server may not store a geographical shape of a parking area associated with the parking management beacons 130. For instance, the geographical shape of a parking area can be provided to the server from the associated parking management beacons 130 together with the vehicle information of the vehicle. The server can calculate a geographical position of a vehicle based in part on the vehicle information and determine whether the vehicle is positioned within the parking area associated with the parking management beacons 130. In some instances, the server may not store a geographical position of the parking management beacons 130. For instance, the geographical position of the parking management beacons 130 can be provided to the server from the parking management beacons 130 together with the vehicle information of the vehicle. The server can calculate a geographical position of a vehicle based in part on the vehicle information and determine whether the vehicle is positioned within the parking area associated with the parking management beacons 130.

The server cart be provided with an interface capable of receiving information from a vehicle management authority. The information can include, for example, an updated parking regulation, an add or removal of a parking area, a change in priority of a parking area, and a change in type of a parking area. For instance, the server can receive and apply an update of parking regulation with respect to a parking area from the vehicle management bureau of local government. For instance, the server can receive and apply a change in geographical shape of a parking area. For instance, the server can receive and apply a change in applicable time period of a parking area.

The parking management beacons can also be equipped with an imaging capturing device such as a camera. Image processing can be performed locally or remotely to recognize an image of the parking area and nearby vehicles and determine if the nearby vehicles are parked within the parking area and with an appropriate orientation/order.

The use of parking management beacons is advantageous because GPS coverage may be poor in certain locations, and because the resolution or precision of GPS may not be sufficient to comply with city parking regulations. For example, if a particular parking regulation specifies that vehicles must be parked at least three feel from cross-walks, but GP'S is accurate to only ten feet, the GPS may lack the precision for vehicles to consistently and fully comply with the parking regulation. In such a case, the use of parking management beacons can supplement the use of GPS. In some embodiments, however, the GPS sensors use real-time kinematic positioning, which is a satellite navigation technique that provides centimeter-level accuracy by measuring the phase of the signal's carrier wave. In such embodiments, the use of parking management beacons would not be required unless GPS coverage were poor. Specific instances of the use of trigonometric principles to determine whether a vehicle is located within a predefined parking area are described in more detail in reference to FIG. 5 through FIG. 7.

Parking regulations may also specify that vehicles should be parked parallel to sidewalks rather than perpendicular to sidewalks, to avoid obstructing pedestrians' right-of-way. Data from the parking management beacons can also be used to determine whether vehicles are oriented properly (e.g. positions and angles of the vehicles relative to the sidewalks).

In some embodiments, data from other vehicle sensors, e.g., radar sensors, LIDAR sensors, or cameras, can further supplement the GPS data and data from the parking management beacons to aid the parking of vehicles in predefined parking areas, particularly when GPS coverage is poor or when the orientation of the parked vehicle is important. For example, parking regulations may prohibit vehicles from parking within three feet of a cross-walk. A vehicle equipped with a camera can transmit collected image data to the server 110. The server 110 can then determine, based on the image data and by using image processing algorithms, e.g., an object detection algorithm in combination with a distance measuring algorithm, whether the vehicle is too close to a cross-walk as defined by parking regulations in the area. e.g., within three feet.

Figure 2:
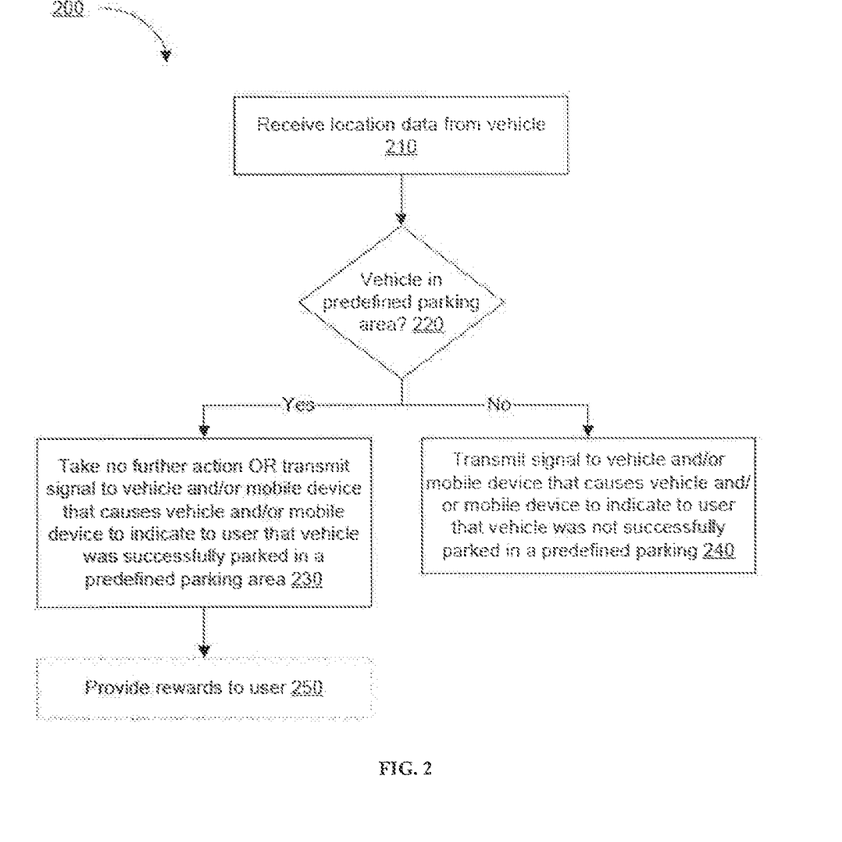
FIG. 2 is a flow chart of a process for determining whether vehicles are located within one or more predefined parking areas in a public space, in accordance with an embodiment of the disclosure.

FIG. 2 is a flow chart of a process 200 for determining whether vehicles are located within one or more predefined parking areas in a public space, in accordance with an embodiment of the disclosure. The process 200 can be performed by a server, for example server 110 of the parking management system 100 described with reference to FIG. 1.

The server can be configured to receive location data from one or more vehicles in the geographic region, e.g., a city in which the parking management system is intended to operate (210). The server and the vehicles may generally communicate with each other over a mobile communication network, but can optionally communicate over a short-range network, e.g., a Bluetooth network, a ZigBee network, or a Wi-Fi network. Generally, the received location data may include a current location, e.g., in GPS coordinates, of the vehicle. The received location data can also include an identifier associated with the vehicle that transmitted the location data. Prior to processing the received location data, the server can determine whether the identifier corresponds to a known identifier of a vehicle in a fleet of vehicles associated with and managed by the parking management system. The location data of the vehicle can be received when a user of the vehicle attempts to lock the vehicle, for example, when the user completes a riding trip.

Using the received location data, the server can determine whether each vehicle is located within one or more predefined parking areas in a public space when (1) the vehicle is not in use or (2) upon completion of a transportation trip by the vehicle (220). The server can make such a determination by comparing the location data of the one or more vehicles to one or more predefined parking areas defined in map data stored on the server. For example, the server can determine whether the GPS coordinates of the one or more vehicles are within a range or bounding box of coordinates in the map data that define a predefined parking area.

In some instances, upon determining that a particular vehicle is located within a predefined parking area. i.e., the user has successfully and properly parked the vehicle within a predefined parking area, the server need not take further action (230). Additionally or optionally, the server can transmit a signal to the vehicle that causes the vehicle to indicate to the user that the user had successfully and properly parked the vehicle in a valid, predefined parking area. The indication can be a visual or audible indication. In some implementations, the server can instead transmit the signal to the user's mobile device via the client software described in reference to FIG. 1. The server can also send a locking instruction to the vehicle to enable a locking mechanism of the vehicle to lock.

In some other instances, upon determining that a vehicle is not located within one of the one or more predefined parking areas upon completion of a transportation trip, the server can transmit a signal to the vehicle. The signal can be configured to cause the vehicle to indicate to the user that the target vehicle is not located within the e one or more predefined parking areas (240). For example, the target vehicle may visually or audibly indicate to the user that the vehicle is not located in a predefined parking area. A visual indication may be a flashing light, or a light of a particular color, for example. In some implementations, the server can encode parking instructions in the signal. The vehicle can visually provide those instructions to the user, e.g., by displaying step-by-step written instructions on a visual display of the vehicle, or audibly provide those instructions to the user through a speaker located on the vehicle. Additionally or optionally, the server can send one or more the above indications and/or instructions to the user's mobile device via the client software. The client software can cause the user's mobile device to display step-by-step written instructions, or can cause the user's mobile device to read those instructions to the user. Alternatively or additionally, the server can prevent the vehicle from locking and continue billing for the trip until the user moves the vehicle to a predefined parking area.

In some embodiments, after a user has completed a transportation trip and successfully/properly parked the vehicle in a predefined parking area, the server can optionally reward the user with redeemable points or other benefits via the client software installed on the user's mobile device (250). Once the user accumulates enough points, the user can redeem the points for a free or reduced-cost trip. By providing such a rewards system, the parking management system can incentivize users to park their vehicles in permitted parking areas, thus reducing safety incidents, fines, and clutter on public sidewalks and streets. In some implementations, users, in using the parking management system, may agree to pay any fines imposed by the city due to vehicles that are parked in prohibited parking areas.

Figure 3:
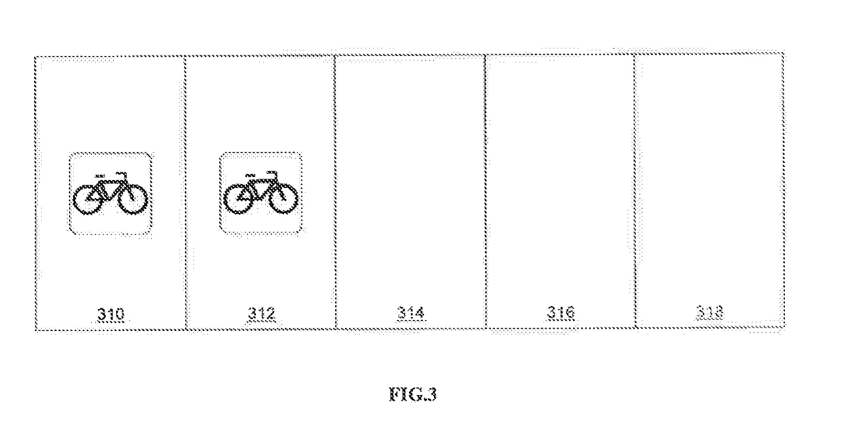
FIG. 3 shows a predefined parking area, in accordance with an embodiment of the disclosure.

FIG. 3 illustrates a predefined parking area 300, in accordance with an embodiment of the disclosure.

The predefined parking area may include one or more partitions (e.g. partitions 310, 312, 314, 316, and 318) in which users can park vehicles upon completion of transportation trips. In the example shown, partitions 310 and 312 may be occupied by vehicles, while partitions 314, 316, and 318 may be unoccupied and available for parking.

In some implementations, each partition may be configured to accommodate no more than one vehicle at a time. The server described with reference to FIG. 1 and FIG. 2 can be configured to determine whether a particular predefined parking area has one or more partitions that are currently unoccupied. As users park their vehicles in partitions of a predefined parking area after they complete transportation trips, the server may record, in the map data stored on the server, that those partitions are now occupied. Similarly, as users select, rent and remove vehicles from the predefined parking area, the server may record in the map data that the partitions from which those vehicles were removed are now unoccupied and therefore available for parking.

Figure 4:
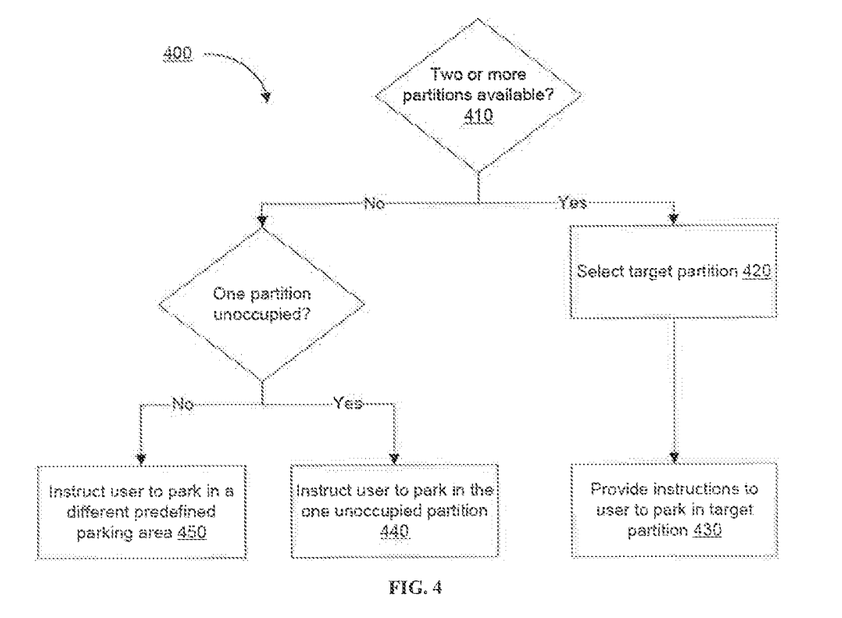
FIG. 4 is a flow chart of a process 400 for selecting a target partition of a predefined parking area in which a user should park a target vehicle, in accordance with an embodiment of the disclosure.

FIG. 4 is a flow chart of a process 400 for selecting a target partition of a predefined parking area in which a user should park a target vehicle, in accordance with an embodiment of the disclosure. The process can be performed by the server 110 described with reference to FIG. 1.

If two or more partitions of a predefined parking area are unoccupied (410), as is the case in FIG. 3, the server can select a target partition from among the two or more partitions that are unoccupied (420). The server can then provide instructions to the user of the target vehicle to park the target vehicle in the target partition (430). As previously described, the server can provide the instructions to the target vehicle and/or the user's mobile device. Generally, the server can select, as a target partition, a partition that minimizes the total area that any parked scooters in the predefined parking area occupy. For example, the server can be configured to select consecutive or adjacent partitions for users to place and park vehicles, such that the vehicles sequentially fill up the partitions (e.g. from left to right, or right to left) as they are being parked. This can help to facilitate the users' parking of the vehicles, since it is often easier to park a vehicle at an available partition at the end of a row of parked vehicles, as opposed to trying to park in an available partition between two adjacently parked vehicles.

If only one partition in the predefined parking area is unoccupied, the server can instruct the user to park the target vehicle in that partition (440).

In some circumstances, all of the partitions of a first predefined parking area may be occupied. In such circumstances, the server can transmit a signal to the target vehicle that causes the target vehicle to (a) indicate to the user that the first predefined parking area is full, and (b) provide instructions to the user to relocate and park the target vehicle in a second predefined parking area that is different from the first predefined parking area (450). The second predefined parking area may include, for example a predefined parking area that is closest in distance to the first predefined parking area and that has spaces/partitions available for parking. Additionally or optionally, the second predefined parking area may include a selection of predefined parking areas that are in close proximity to the first predefined parking area and that have spaces/partitions available for parking. Alternatively, and as previously described, the server can send the above indications and/or instructions to a mobile device associated with the user of the target vehicle via the client software.

In some circumstances, a user may inadvertently park his or her vehicle in multiple partitions, e.g., with the vehicle traversing across two or more different partitions. The server can determine, based at least in part on the location data received from the vehicle, that the vehicle is in fact parked traversing across two or more partitions. In response to that determination, the server can provide a notification/prompt to the user, e.g., via the user's mobile device, to correct the positioning of the target vehicle within the predefined parking area such that the target vehicle does not occupy more than one partition. In determining whether a vehicle is parked traversing across two or more partitions, the server can, in addition to using GPS data from the vehicle, use data from the parking management beacons or from additional sensors on the vehicle.

Figure 5A:
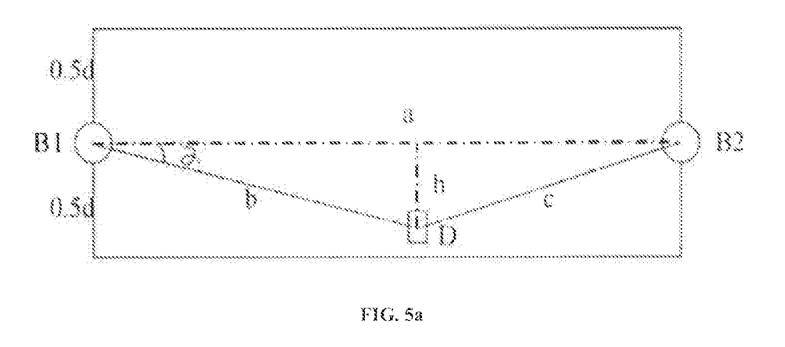
FIG. 5A and FIG. 5B depict examples of a predefined parking area having a rectangular shape and a plurality of parking management beacons, in accordance with different embodiments of the disclosure.
Figure 5B:
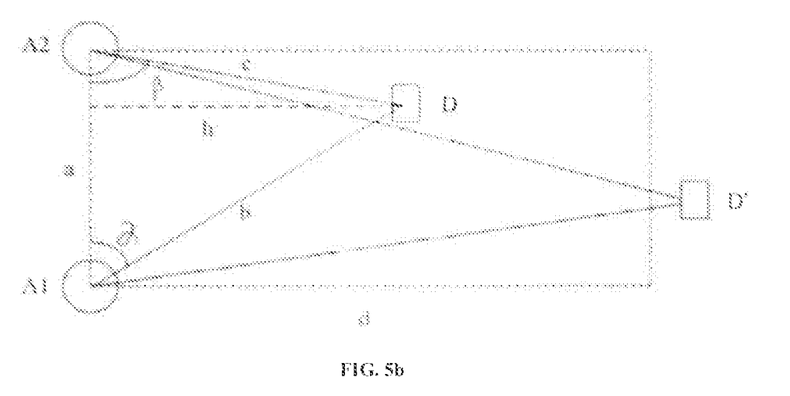

FIG. 5A and FIG. 5B depict examples of a predefined parking area having a rectangular shape and a plurality of parking management beacons, in accordance with different embodiments of the disclosure.

In the example of FIG. 5A, a plurality of parking management beacons (e.g. B1 and B2) can be respectively positioned at midpoints of opposite sides of the rectangular parking area. The parking management beacons can each be configured to receive vehicle information from the vehicle D and transmit the vehicle information to a server as described herein.

In some instances, the vehicle information can comprise a distance from the vehicle to each parking management beacon. Distance measuring units in the parking management beacons can determine the distances b and c by analyzing the strength of an uplink signal, e.g., by using a Received Signal Strength Indication (RSSI) ranging method, received from the vehicle D. The distances b and c can then be transmitted to a server via a telecommunication link such as the internet.

Using the distances, the server can determine whether the vehicle is positioned within the rectangular parking area. For instance, the server can determine that the vehicle is positioned within the parking area if (1) a vertical distance from the vehicle to a line connecting the two parking management beacons is less than a preset value, and (2) angles formed between the vehicle and the line connecting the two parking management beacons are both acute angles. The preset value can be $½*d$, where d is a length of a side of the rectangular parking area. The vertical distance and the angles can be calculated using a trigonometric function.

Once the server determines that the vehicle is positioned within the predefined parking area associated with the parking management beacons, the server can provide a confirmation to the parking management beacons that the vehicle is within the predefined parking area. Without the confirmation from the server, the vehicle may not be locked and a fee will be charged if a user of the vehicle attempts to lock the vehicle. The server can additionally send a confirmation to the vehicle itself, or to a mobile device associated with the user of the vehicle.

In the example of FIG. 5B, the two parking management beacons A1 and A2 can be respectively positioned at adjacent corner points of the rectangular parking area. The parking management beacons can each be configured to receive vehicle information from the vehicle D and transmit the vehicle information to a server as described herein.

The vehicle information can comprise a distance from the vehicle D to each parking management beacons A1 and A2. The distance information b and c can then be transmitted to the server. The server can determine whether the vehicle is positioned within the rectangular parking area. For instance, the server can determine that the vehicle is positioned within the parking area if (1) a vertical distance from the vehicle to a line connecting the two parking management beacons is less than a preset value, and (2) angles formed between the vehicle and the line connecting the two parking management beacons are both acute angles. The preset value can be a length of a side of the rectangular parking area. The server can determine that the vehicle D is positioned within the parking area while the vehicle D' is not positioned within the parking area, because a vertical distance from the vehicle D' to a line connecting the two parking management beacons A1 and A2 is larger than a length of a side of the rectangular parking area.

Figure 6:
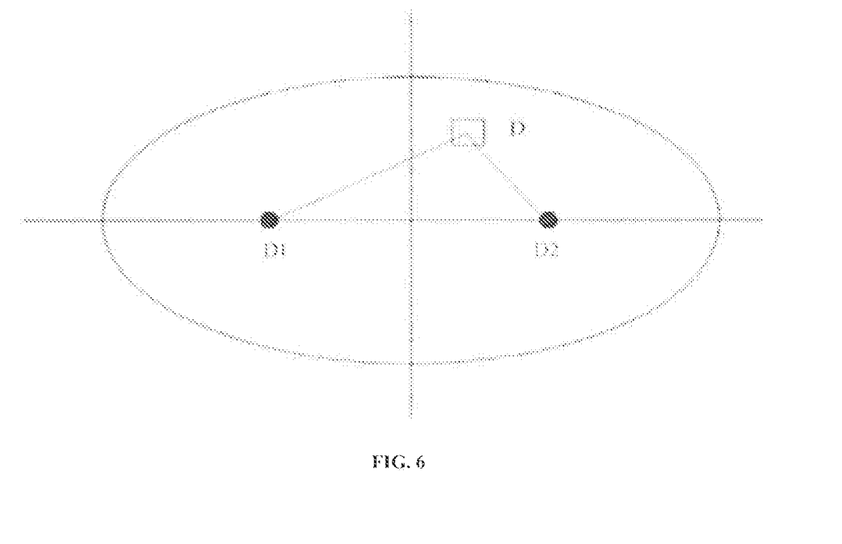
FIG. 6 shows an example of a predefined parking area having an elliptical shape, in accordance with an embodiment of the disclosure.

FIG. 6 depicts an example of predetermined parking area having an elliptical shape and a plurality of parking management beacons, in accordance with an embodiment of the disclosure. A plurality of parking management beacons (e.g. D1 and D2) can be respectively positioned at the focuses of the elliptical parking area. The parking management beacons can each be configured to receive vehicle information from the vehicle D and transmit the vehicle information to a server as described herein.

The vehicle information can comprise a distance from the vehicle D to each parking management beacons D1 and D2. The distance information can then be transmitted to the server which is configured to determine whether the vehicle is positioned within the elliptical parking area. For instance, the server can determine that the vehicle is positioned within the parking area if a sum of distances between the vehicle D and the two parking management beacons D1 and D2 is less than or equal to a length of the long axis of the ellipse.

Figure 7:
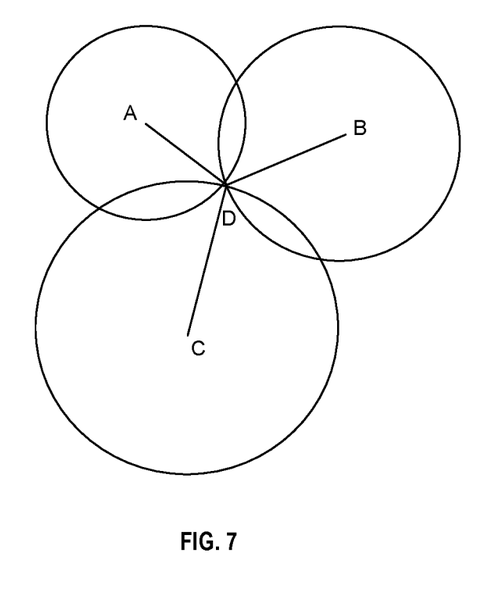
FIG. 7 shows an example of a predefined parking area having an irregular shape, in accordance with an embodiment of the disclosure.

FIG. 7 depicts an example of a predefined vehicle parking area having an irregular shape in accordance with an embodiment of the disclosure. The irregular-shaped parking area can be divided into a plurality of sub-parking areas. In the example shown in FIG. 8, the irregular parking area may include three sub-parking areas which are respectively defined by the three parking management beacons A, B and C. Each of the sub-parking areas may be, for example a circular parking area.

The coordinates $(x_a, y_a)$, $(x_b, yb)$, and $(x_c, y_c)$ of the three parking management beacons A. B and C are known. Distances $d_a$, $d_b$, and $d_c$ from the three parking management beacons A, B and C to the vehicle D can be measured by analyzing the strength of an uplink signal, e.g., by using a Received Signal Strength Indication (RSSI) ranging method, received from the vehicle D. The server can determine that the coordinate (x,y) of the vehicle D is $$\begin{bmatrix} x \\ y \end{bmatrix} = \begin{bmatrix} 2(x_a - x_c) & 2(y_a - y_c) \\ 2(x_b - x_c) & 2(y_b - y_c) \end{bmatrix}^{-1} \begin{bmatrix} x_a^2 - x_c^2 + y_a^2 - y_c^2 + d_c^2 - d_a^2 \\ x_b^2 - x_c^2 + y_b^2 - y_c^2 + d_c^2 - d_b^2 \end{bmatrix}.$$

In the example shown in FIG. 7, a coordinate range of the parking area can be known (e.g., pre-stored at the server or a database in communication with the server), such that the server can compare the coordinate of the vehicle D against the coordinate range of the parking area and determine whether the vehicle is positioned within the parking area.

In some embodiments, the vehicle can be provided with a positioning module such as a Global Position System (GPS). The vehicle information can comprise the geographical position of the vehicle which is measured by the GPS module. The server can be configured to compare the geographical position of the vehicle against the coordinate range of the parking area and determine whether the vehicle is positioned within the parking area.

Figure 8:
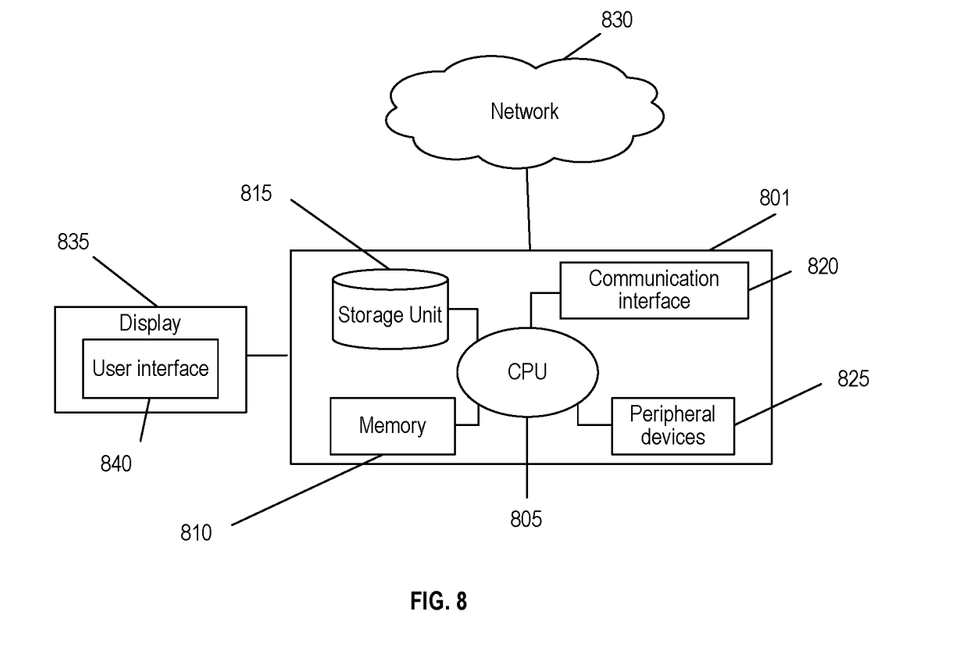
FIG. 8 shows a computer system that can be configured to implement any computing system disclosed in the present application.

FIG. 8 shows a computer system 801 that can be configured to implement any computing system disclosed in the present application. The computer system 801 can comprise a mobile phone, a tablet, a wearable device, a laptop computer, a desktop computer, a central server, etc.

The computer system 801 includes a central processing unit (CPU, also "processor" and "computer processor" herein) 805, which can be a single core or multi core processor, or a plurality of processors for parallel processing. The CPU can be the processor as described above. The computer system 801 also includes memory or memory location 810 (e.g., random-access memory, read-only memory, flash memory), electronic storage unit 815 (e.g., hard disk), communication interface 820 (e.g., network adapter) for communicating with one or more other systems, and peripheral devices 825, such as cache, other memory, data storage and/or electronic display adapters. In some cases, the communication interface may allow the computer to be in communication with another device such as the imaging device or audio device. The computer may be able to receive input data from the coupled devices for analysis. The memory 810, storage unit 815, interface 820 and peripheral devices 825 are in communication with the CPU 805 through a communication bus (solid lines), such as a motherboard. The storage unit 815 can be a data storage unit (or data repository) for storing data. The computer system 801 can be operatively coupled to a computer network ("network") 830 with the aid of the communication interface 820. The network 830 can be the Internet, an internet and/or extranet, or an intranet and/or extranet that is in communication with the Internet. The network 830 in some cases is a telecommunication and/or data network. The network 830 can include one or more computer servers, which can enable distributed computing, such as cloud computing. The network 830, in some cases with the aid of the computer system 801, can implement a peer-to-peer network, which may enable devices coupled to the computer system 801 to behave as a client or a server.

The CPU 805 can execute a sequence of machine-readable instructions, which can be embodied in a program or software. The instructions may be stored in a memory location such as the memory 810. The instructions can be directed to the CPU 805, which can subsequently program or otherwise configure the CPU 805 to implement methods of the present disclosure. Examples of operations performed by the CPU 805 can include fetch, decode, execute, and writeback.

The CPU 805 can be part of a circuit, such as an integrated circuit. One or more other components of the system 801 can be included in the circuit. In some cases, the circuit is an application specific integrated circuit (ASIC).

The storage unit 815 can store files, such as drivers, libraries and saved programs. The storage unit 815 can store user data, e.g., user preferences and user programs. The computer system 801 in some cases can include one or more additional data storage units that are external to the compute system 801, such as located on a remote server that is in communication with the computer system 801 through an intranet or the Internet.

The computer system 801 can communicate with one or more remote computer systems through the network 830. For instance, the computer system 801 can communicate with a remote computer system of a user. Examples of remote computer systems include personal computers, slate or tablet PC's, smart phones, personal digital assistants, and so on. The user can access the computer system 801 via the network 830.

Methods as described herein can be implemented by way of machine (e.g., computer processor) executable code stored on an electronic storage location of the computer system 801, such as, for example, on the memory 810 or electronic storage unit 815. The machine executable or machine readable code can be provided in the form of software. During use, the code can be executed by the processor 805. In some cases, the code can be retrieved from the storage unit 815 and stored on the memory 810 for ready access by the processor 805. In some situations, the electronic storage unit 815 can be precluded, and machine-executable instructions are stored on memory 810.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory)

or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 801 can include or be in communication with an electronic display 835 that comprises a user interface 840 for providing, for example, a management interface. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 805.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A parking management system, comprising: one or more servers in communication with one or more vehicles, wherein the one or more vehicles are configured to be shared and utilized by one or more users for transportation, and wherein the one or more servers are configured to: receive location data from the one or more vehicles; determine, based at least in part on the received location data and for each vehicle, whether the vehicle is located within one or more predefined parking areas when the vehicle is not in use or upon completion of a transportation trip by the vehicle; wherein the one or more predefined parking areas comprises a plurality of partitions, wherein each partition of the plurality of partitions is configured to accommodate no more than one vehicle at a time, wherein the one or more servers are configured to determine whether each of the plurality of partitions is unoccupied or occupied by a vehicle, and wherein the one or more predefined parking areas comprises a dockless parking area, and transmit a signal to a target vehicle when the target vehicle is not located within the one or more predefined parking areas upon completion of a transportation trip, wherein the one or more vehicles comprise the target vehicle, and wherein the signal is configured to cause a continuation of a charging for the transportation trip.

2. The parking management system of claim 1, wherein the signal is further configured to cause the target vehicle to indicate to a user of the target vehicle that the target vehicle is not located within the one or more predefined parking areas or cause the target vehicle to maintain an unlocked status.

3. The parking management system of claim 1, wherein the one or more predefined parking areas are defined in map data stored on the one or more servers, and the one or more servers are configured to determine whether the one or more vehicles are located within the one or more predefined parking areas, at least in part by comparing the received location data of the one or more vehicles to the one or more predefined parking areas in the map data.

4. The parking management system of claim 1, further comprising one or more parking management beacons associated with at least a first predefined parking area,
wherein the one or more parking management beacons are in communication with the one or more vehicles,
wherein each parking management beacon is configured to receive a signal from the target vehicle, and
wherein the one or more servers are further configured to determine, based on one or more properties of the signal, whether the target vehicle is within the first predefined parking area.

5. The parking management system of claim 4, wherein the one or more properties comprise, for each parking management beacon, a signal strength and a signal direction.

6. The parking management system of claim 1, wherein the one or more predefined parking areas comprise at least a parking permitted area, a parking restricted area or a parking restricted area.

7. A parking management method, comprising: receiving location data from one or more vehicles, wherein the one or more vehicles are in communication with one or more servers, and wherein the one or more vehicles are configured to be shared and utilized by one or more users for transportation; and determining, based at least in part on the received location data and for each vehicle, whether the vehicle is located within one or more predefined parking areas when the vehicle is not in use or upon completion of a transportation trip by the vehicle; wherein the one or more predefined parking areas comprises a plurality of partitions, wherein each partition of the plurality of partitions is configured to accommodate no more than one vehicle at a time, wherein the one or more servers are further configured to determine whether each of the plurality of partitions is unoccupied or occupied by a vehicle, and wherein the one or more predefined parking areas comprises a dockless parking area, transmit a signal to a target vehicle when the target vehicle is not located within the one or more predefined parking areas upon completion of a transportation trip, wherein the one or more vehicles comprise the target vehicle, and wherein the signal is configured to cause a continuation of a charging for the transportation trip.

8. The parking management method of claim 7, further comprising:
    wherein the signal is further configured to cause the target vehicle to indicate to a user of the target vehicle that the target vehicle is not located within the one or more predefined areas or cause the target vehicle to maintain an unlocked status.

9. The parking management method of claim 7, wherein the one or more predefined parking areas are defined in map data stored on the one or more servers, and
    wherein the one or more servers are configured to determine whether the one or more vehicles are located within the one or more predefined parking areas, at least in part by comparing the received location data of the one or more vehicles to the one or more predefined parking areas in a map data.

10. The parking management method of claim 7, further comprising:
    providing one or more parking management beacons associated with at least a first predefined parking area,
    wherein the one or more parking management beacons are in communication with one or more vehicles,
    wherein each parking management beacon is configured to receive a signal from the target vehicle, and
    determining, based on one or more properties of the signal, whether the target vehicle is within the first predefined parking area.

11. The parking method of claim 10, wherein the one or more properties comprise, for each parking management beacon, a signal strength and a signal direction.

12. The parking management method of claim 7, wherein the one or more predefined parking areas comprise at least a parking permitted area and a parking restricted area.

13. A non-transitory computer-related medium storing executable instructions causing a parking management system to perform: receiving location data from one or more vehicles, wherein the one or more vehicles are in communication with one or more servers, and wherein the one or more vehicles are configured to be shared and utilized by one or more users for transportation; and determining, based at least in part on the received location data and for each vehicle, whether the vehicle is located within one or more predefined parking areas when the vehicle is not in use or upon completion of a transportation trip by the vehicle; wherein the one or more predefined parking areas comprises a plurality of partitions, wherein each partition of the plurality of partitions is configured to accommodate no more than one vehicle at a time, and wherein the one or more servers are further configured to determine whether each of the plurality of partitions is unoccupied or occupied by a vehicle, and wherein the one or more predefined parking areas comprises a dockless parking area, transmit a signal to a target vehicle when the target vehicle is not located within the one or more predefined parking areas upon completion of a transportation trip, wherein the one or more vehicles comprise the target vehicle, and wherein the signal is configured to cause a continuation of a charging for the transportation trip.

14. The non-transitory computer-readable medium of claim 13, further causing the system to perform:
    wherein the signal is further configured to cause the target vehicle to indicate to a user of the target vehicle that the target vehicle is not located within the one or more predefined areas or cause the target vehicle to maintain an unlocked status.

15. The non-transitory computer-readable medium of claim 13, wherein the one or more predefined parking areas are defined in map data stored on the one or more servers, and
    wherein the one or more servers are configured to determine whether the one or more vehicles are located within the one or more predefined parking areas, at least in part by comparing the received location data of the one or more vehicles to the one or more predefined parking areas in a map data.

16. The non-transitory computer-readable medium of claim 13, further causing the system to perform:
    providing one or more parking management beacons associated with at least a first predefined parking area,
    wherein the one or more parking management beacons are in communication with one or more vehicles,
    wherein each parking management beacon is configured to receive a signal from the target vehicle, and
    determining, based on one or more properties of the signal, whether the target vehicle is within the first predetermined parking area.

17. The non-transitory computer-readable medium of claim 13, wherein the one or more predefined parking areas comprise at least a parking permitted area and a parking restricted area.

* * * * *